(12) United States Patent
Ishii

(10) Patent No.: US 7,259,932 B2
(45) Date of Patent: Aug. 21, 2007

(54) MAGNETIC DISK UNIT

(75) Inventor: Koji Ishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 44 days.

(21) Appl. No.: 11/312,975

(22) Filed: Dec. 20, 2005

(65) Prior Publication Data

US 2007/0064330 A1 Mar. 22, 2007

(30) Foreign Application Priority Data

Sep. 21, 2006 (JP) ............................. 2005-274229

(51) Int. Cl.
*G11B 21/02* (2006.01)

(52) U.S. Cl. ..................................... 360/75
(58) Field of Classification Search ..................... None
See application file for complete search history.

(56) References Cited

U.S. PATENT DOCUMENTS 6,385,000 B1 * 5/2002 Ottesen et al. ............... 360/63

6,781,786 B2 8/2004 Ishii

FOREIGN PATENT DOCUMENTS

JP 2003-249044 9/2003

* cited by examiner

*Primary Examiner*—Andrew L. Sniezek
(74) *Attorney, Agent, or Firm*—Greer, Burns & Crain, Ltd.

(57) ABSTRACT

In a magnetic disk unit, a number of heads that is settable to a usable setting is less than a maximum number of heads providable in the magnetic disk unit. The magnetic disk unit includes a storage part to provide a buffer region that is usable as a data buffer, a reading part to read head information from a magnetic disk, and a control part to reserve a storage region in the storage part for storing the head information based on the maximum number of heads included in the head information. The control part also stores parameters with respect to the heads having the usable setting in reserved storage region, and releases a region of the storage part other than a storage region occupied by the parameters of the reserved storage region, when storing the head information in the storage part.

8 Claims, 5 Drawing Sheets

FIG.3

| HEAD NO. | SECTOR NO. |
|---|---|
| HN0 | SEC1~SEC10 |
| HN1 | SEC11~SEC20 |
| HN2 | SEC21~SEC30 |
| HN3 | SEC31~SEC40 |

MAGNETIC DISK UNIT

BACKGROUND OF THE INVENTION

1. Field of the Invention

The present invention generally relates to magnetic disk units, and more particularly to a magnetic disk unit which is constructed to read parameters that are set for each head from a system region or area on a magnetic disk and to store or develop the read parameters in a storage part.

2. Description of the Related Art

Characteristics of heads and magnetic disks vary for each head and each magnetic disk. For example, if the output differs for each head, it is necessary to change the gain of an automatic gain control (AGC) in a read channel (RDC) within a magnetic disk unit for each head. In addition, if the write performance differs for each head, it is necessary to change a write current of a head amplifier within the magnetic disk unit and a write precompensation of the read channel for precompensating a phenomenon in which the actual write position appears shifted from a target position. Furthermore, if the mechanical resonance characteristic differs from each head, it is necessary to change a notch filter characteristic of a servo system within the magnetic disk unit for each head.

Recently, due to the core width and the read write performances of the heads used, techniques generally employed in the magnetic disk unit vary the track per inch (TPI) and the data transfer rate. In this case, the TPI and the sector format information differ for each head, and for this reason, it is necessary to change the parameters to optimum parameters that are different for each head.

The parameters that are set for each head include parameters that depend upon the characteristics of the magnetic disk that corresponds to each head, and there are many kinds of parameters that are set for each head. Typical read parameters used at the time of the read include the read frequency, sense current of an MR head, AGC gain, filter cutoff frequency, boost of specific portion of the filter characteristic, constants of a FIR filter, vertical asymmetry correction of the reproduced waveform, and the like. In addition, typical write parameters used at the time of the write include the write frequency, write precompensation, write current, overshoot of the write current, and the like.

Accordingly, because the optimum parameters differ for each head, the parameter settings must be tabulated and stored in the storage part within the magnetic disk unit independently for each of the heads. The parameters for each head are prerecorded in the system region on the magnetic disk, and when the power of the magnetic disk unit is turned ON, the parameters are read from the system region and stored in the storage part within the magnetic disk unit as parameter tables for each of the heads. The parameters of the parameter tables are read from the storage part and used thereafter at the time of the read or write.

The parameters for each head are stored as the parameter table in the storage part within the magnetic disk unit and used, as described above. But in order to reduce the number of processes required to develop the firmware of the magnetic disk unit, the firmware is created so as to store the parameter tables at the same addresses of the storage part even when the number of heads used differ among the magnetic disk units. For example, in the case of a type of the magnetic disk unit capable of providing up to four heads at the maximum, a model having a storage capacity of 400 GB is formed by using the four heads, and a model of the same type but having a storage capacity of 100 GB is formed by using one head. In this case, the model having the storage capacity of 100 GB may only be provided with one head or, provided with more than one head but set to use only one head. However, since the storage addresses of the parameter tables within the storage part are the same for the different models of the same type of magnetic disk unit, the parameter table corresponding to the one head that is set to be usable includes the parameters peculiar to this one head regardless of whether the magnetic disk unit is the model having the storage capacity of 400 GB or the model having the storage capacity of 100 GB, while the parameter tables corresponding to the three heads that are set to be non-usable are empty in the case of the model having the storage capacity of 100 GB. But in the model having the storage capacity of 100 GB, a storage region for storing the parameter tables corresponding to the three heads that are set to be non-usable is still reserved within the storage part of the magnetic disk unit.

In order to improve the performance of the magnetic disk unit, cache control techniques, such as the preread to a cache region of the storage part and a cache operation at the time of the write, are essential. In order to increase the effects of the cache control, it is of course preferable that the cache region is large, and a storage region that is not used at all prevents the improvement of the performance of the magnetic disk unit.

A Japanese Laid-Open Patent Application No. 2003-249044 proposes a magnetic disk unit that stores the parameters for each head in the storage part. The Japanese Laid-Open Patent Application No. 2003-249044 has a corresponding U.S. Pat. No. 6,781,786.

In the conventional magnetic disk unit using the firmware which stores the parameter tables at the same addresses within the storage part regardless of the number of heads (or the storage capacity) that are set to be usable, the storage region for the parameter tables are fixedly reserved within the storage part depending on the maximum number of heads that can be provided in the magnetic disk unit. For this reason, in the case of the magnetic disk unit that is set to use a number of heads smaller than the maximum number of heads that can be provided in this magnetic disk unit, the storage region for the parameter tables are reserved within the storage part with respect to the heads that are set to be non-usable and are actually not used. Consequently, there was a problem in that the usable (or available) storage capacity of the storage part becomes unnecessarily reduced.

As described above, there are many kinds of parameters that are set for each head. In addition, the write parameters used at the time of the write may be changed depending on the temperature, and thus, even for the same kind of parameter, the parameter table may include values that are different for each temperature, and the number of parameters increases considerably in such a case. Furthermore, even for the same parameter, the parameter table may include values that are different for each zone on the magnetic disk, and the number of parameters also increases considerably in such a case.

Recently, techniques have been proposed to provide a built-in heater in the head, and to improve the characteristics of the head by making the head project towards the magnetic disk by a driving current applied to the heater. In this case, the driving current applied to the heater is set for each head, and the driving current for each head is further set for each temperature and set also for each zone. Therefore, the number of parameters set for each head increases considerably in such a case.

Moreover, although the number of parameters set for each magnetic disk is smaller compared to the number of parameters set for each head, problems similar to those described above also occurred with respect to the parameters set for each magnetic disk.

Therefore, the storage capacity of the storage region within the storage part for storing the parameter tables is increasing with the increase of the number of kinds of parameters, and it is undesirable to reserve the storage region within the storage part for storing the parameter tables with respect to the heads that are set to be non-usable and actually not used and/or the magnetic disks that are set to be non-usable and actually not used.

SUMMARY OF THE INVENTION

Accordingly, it is a general object of the present invention to provide a novel and useful magnetic disk unit in which the problems described above are suppressed.

Another and more specific object of the present invention is to provide a magnetic disk unit which can suppress an increase of a storage region within a storage part for storing parameters that are set for each head and/or for each magnetic disk.

Still another object of the present invention is to provide a magnetic disk unit in which a number of heads that is settable to a usable setting is less than a maximum number of heads providable in the magnetic disk unit, comprising a storage part configured to provide a buffer region that is usable as a data buffer; a reading part configured to read head information from a magnetic disk; and a control part configured to reserve a storage region in the storage part for storing the head information based on the maximum number of heads included in the head information, to store parameters with respect to the heads having the usable setting in reserved storage region, and to release a region of the storage part other than a storage region occupied by the parameters of the reserved storage region, when storing the head information in the storage part. According to the magnetic disk unit of the present invention, it is possible to suppress an increase of the storage region within the storage part for storing the parameters that are set for each head.

A further object of the present invention is to provide a magnetic disk unit in which a number of magnetic disks that is settable to a usable setting is less than a maximum number of magnetic disks providable in the magnetic disk unit, comprising a storage part configured to provide a buffer region that is usable as a data buffer; a reading part configured to read disk specification information from a magnetic disk; and a control part configured to reserve a storage region in the storage part for storing the disk specification information based on the maximum number of magnetic disks included in the disk specification information, to store parameters with respect to the magnetic disks having the usable setting in reserved storage region, and to release a region of the storage part other than a storage region occupied by the parameters of the reserved storage region, when storing the disk specification information in the storage part. According to the magnetic disk unit of the present invention, it is possible to suppress an increase of the storage region within the storage part for storing parameters that are set for each magnetic disk.

Other objects and further features of the present invention will be apparent from the following detailed description when read in conjunction with the accompanying drawings.

BRIEF DESCRIPTION OF THE DRAWINGS

FIG. 2 is a flow chart for explaining an example of an operation of the magnetic disk unit when the power is turned ON;

FIG. 3 is a diagram showing an example of a relationship of head numbers and sector numbers of sectors in which parameters of each head number are recorded;

FIG. 4 is a flow chart for explaining another example of the operation of the magnetic disk unit when the power is turned ON; and FIG. 5 is a flow chart for explaining an example of the operation of another embodiment of the magnetic disk unit according to the present invention when the power is turned ON.

DESCRIPTION OF THE PREFERRED EMBODIMENTS

Figure 1:
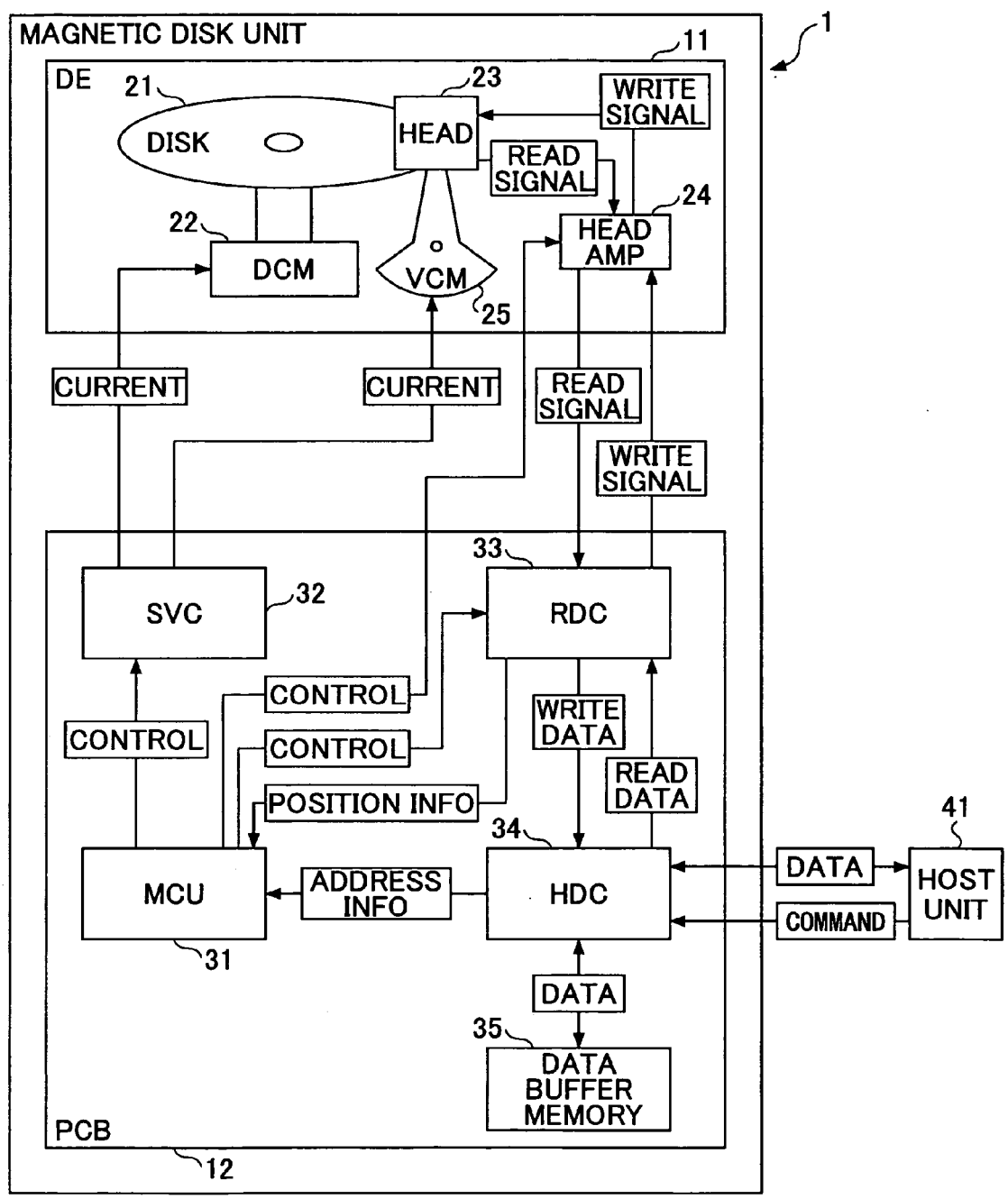
FIG. 1 is a system block diagram showing a hardware structure of an important part of an embodiment of a magnetic disk unit according to the present invention.

A description will be given of embodiments of the magnetic disk unit according to the present invention, by referring to the drawings.

FIG. 1 is a system block diagram showing a hardware structure of an important part of an embodiment of the magnetic disk unit according to the present invention. For the sake of convenience, it is assumed that a magnetic disk unit 1 shown in FIG. 1 is a type that can provide up to N heads at the maximum, where N is an integer greater than or equal to two. The magnetic disk unit 1 includes a disk enclosure (DE) 11 and a printed circuit board (PCB) 12.

The disk enclosure 11 includes one or a plurality of magnetic disks 21, a DC motor (DCM) 22 for rotating the magnetic disk 21, one or a plurality of magnetic heads (hereinafter simply referred to as heads) 23 provided correspondingly to the one or plurality of magnetic disks 21, a head amplifier 24, a voice coil motor (VCM) 25 for moving the head 23, and the like. The disk enclosure 11 is sealed from the outside via a filter (not shown), so as to protect the magnetic disk 21 and the head 23 from dust particles and the like.

In a case where the magnetic disk unit 1 is formed as a model having a desired storage capacity, it is possible to provide only M heads 23 (and a corresponding number of magnetic disks 21) or, to provide M+1 or more heads 23 (and a corresponding number of magnetic disks 21) but set only M heads 23 (and a corresponding number of magnetic disks 21) to be usable (or to be used), where M is an integer greater than or equal to one.

The PCB 12 includes a micro computer unit (MCU) 31, a servo controller (SVC) 32, a read channel (RDC) 33, a hard disk controller (HDC) 34, a data buffer memory 35 forming a storage part (or storage means), and the like. The data buffer memory 35 is made up of a RAM or the like. The storage part (or storage means) includes a memory (not shown) that is formed by a ROM or the like and stores the firmware and the like.

The PCB 12 is connected to a host unit 41 in a manner capable of sending and receiving data and commands or instructions.

Parameters set for each head 23 in the magnetic disk unit 1 are prerecorded in a system region or area on the magnetic disk 21. The parameters set for each head 23 are read from the system region and stored or developed in the data buffer memory 35 as parameter tables for each head 23. The parameters of the parameter tables are read from the data buffer memory 35 and used thereafter at the time of the read or write.

The parameters set for each head 23 include parameters that depend upon the characteristics of the magnetic disk 21 that corresponds to each head 23, and there are many kinds of parameters that are set for each head 23. Typical read parameters used at the time of the read include the read frequency, sense current of an MR head, AGC gain, filter cutoff frequency, boost of specific portion of the filter characteristic, constants of a FIR filter, vertical asymmetry correction of the reproduced waveform, and the like. In addition, typical write parameters used at the time of the write include the write frequency, write precompensation, write current, overshoot of the write current, and the like.

In addition, the write parameters used at the time of the write may be changed depending on the temperature, and thus, even for the same kind of parameter, the parameter table may include values that are different for each temperature, and the number of parameters increases considerably in such a case. Furthermore, even for the same parameter, the parameter table may include values that are different for each zone on the magnetic disk 21, and the number of parameters also increases considerably in such a case.

Further, in a case where the technique that provides a built-in heater in the head 23 is employed to improve the characteristics of the head 23 by making the head 23 project towards the magnetic disk 21 by a driving current applied to the heater, the driving current applied to the heater is set for each head 23, and the driving current for each head 23 is further set for each temperature and set also for each zone. Therefore, the number of parameters set for each head 23 increases considerably in such a case.

Therefore, the storage capacity of the storage region within the data buffer memory 35 for storing the parameter tables increases with the increase of the number of kinds of parameters. If the data buffer memory 35 has a memory capacity of 2 MB, for example, the percentage of the memory capacity that will be occupied by the parameters for one head 23 is approximately 1.5%, and the percentage of the memory capacity that will be used by a cache operation is approximately 80%. In addition, if the data buffer memory 35 has a memory capacity of 8 MB, for example, the percentage of the memory capacity that will be occupied by the parameters for one head 23 is approximately 0.4%, and the percentage of the memory capacity that will be used by the cache operation is approximately 95%.

The basic structure itself of the magnetic disk unit 1 shown in FIG. 1 is known, and a detailed description thereof will be omitted. The MCU 31 controls the entire magnetic disk unit 1, including the head amplifier 24, the read channel 33 and the like. The MCU 31 receives from the read channel 33 position information indicating a position of the head 23 on the magnetic disk 21, and receives from the HDC 34 address information of the data buffer memory 35. The SVC 32 controls the DCM 22 and the VCM 25 under the control of the MCU 31. The read channel 33 includes a read processing system and a write processing system. The read processing system processes a read signal that is read from the magnetic disk 21 by the head 23 and obtained via the head amplifier 24. The write processing system processes a write signal that is to be supplied to the head 23 via the head amplifier 24 and written on the magnetic disk 21 by the head 23. The HDC 34 controls the exchange of read data and write data between the host unit 41 and the magnetic disk unit 1 based on the instruction from the host unit 41. In addition, the HDC 34 carries out the cache operation to temporarily store the read data and the write data in the data buffer memory 35.

As will be described later in conjunction with FIGS. 2 through 4, the data buffer memory 35 forms a storage part (or storage means) for providing a buffer region that is usable as a data buffer. In addition, the MCU 31 forms a control part (or control means) for carrying out a general control, including the control of the reading of unit inherent information from the system region on the magnetic disk 21 by a reading part (or reading means) formed by the VCM 25, the DCM 22, the read channel 33 and the like, and the control of the storing of the unit inherent information into the storage part (or storage means). The unit inherent information indicates information that is inherent or peculiar to the magnetic disk unit 1.

A memory control part within the MCU 31, for controlling the storage part (or storage means), allocates the storage region of the storage part (or storage means) for each information, such as head information and media information, when storing the unit inherent information, and determines the address range of the storage region for the information such as the head information and the media information. An address range of the storage region, other than the determined address range for the information such as the head information and the media information, is determined as a buffer region or the like usable to store other information. These address ranges or addresses are registered in memory management information.

For example, the memory control part for controlling the storage part (or storage means) determines in advance the address ranges of the storage regions from the maximum number of heads 23 that may be provided in the magnetic disk unit 1, so that a required amount of storage capacity can be reserved for the storage regions of the storage part (or storage means). In addition, one or more usable heads 23, included in the head information, are recognized, and parameters with respect to each usable head 23 are stored at predetermined addresses of the storage part (or storage means).

Even if parameters with respect to each non-usable head 23, other than the usable heads 23, are included in the head information, these parameters with respect to each non-usable head 23 do not need to be stored. Hence, the address range of the storage region prepared for the non-usable heads 23 of the maximum number of usable heads 23 indicates a vacant region that may be used as the buffer region. For this reason, the address range of the buffer region that is determined in advance is changed, and the memory management information is reset, so that the vacant region may be used as the buffer region.

Thereafter, the memory control part for controlling the storage part (or storage means) can read various information from the storage part (or storage means) by specifying the address based on the memory management information.

The basic structure of the magnetic disk unit 1 is of course not limited to the basic structure shown in FIG. 1, and any suitable basic structure may be used. The suitable basic structure reads the parameters set for each head 23 set to be usable (that is, each head with the usable setting) from the system region on the magnetic disk 21 when the power of the magnetic disk unit 1 is turned ON, for example, stores or develops the read parameters in the data buffer memory 35 as parameter tables for each head 23, and reads the parameters of the parameter tables from the data buffer memory 35 for use thereafter at the time of the read or write. For example, the MCU 31 and the HDC 34 may be integrated into a single large scale integrated circuit (LSI) or, the MCU 31, the HDC 34 and the read channel 33 may be integrated into a single LSI.

Normally, a track on the magnetic disk 21 is recorded with servo information indicating the position of the head 23, in addition to data that are read from and written on the track. A servo signal read from the magnetic disk 21 by the head 23 is decoded into the position information by the read channel 33, and is supplied to the MCU 31. The MCU 31 controls the VCM 25 so that the head 23 scans a target track, based on the position information.

Next, a description will be given of an example of an operation of the magnetic disk unit 1 when the power is turned ON, by referring to FIG. 2. FIG. 2 is a flow chart for explaining this example of the operation of the magnetic disk unit 1 when the power is turned ON, and corresponds to a process controlled by the MCU 31. For the sake of convenience, it is assumed that the magnetic disk unit 1 is capable of providing up to N=4 heads 23 at the maximum.

Figure 2:
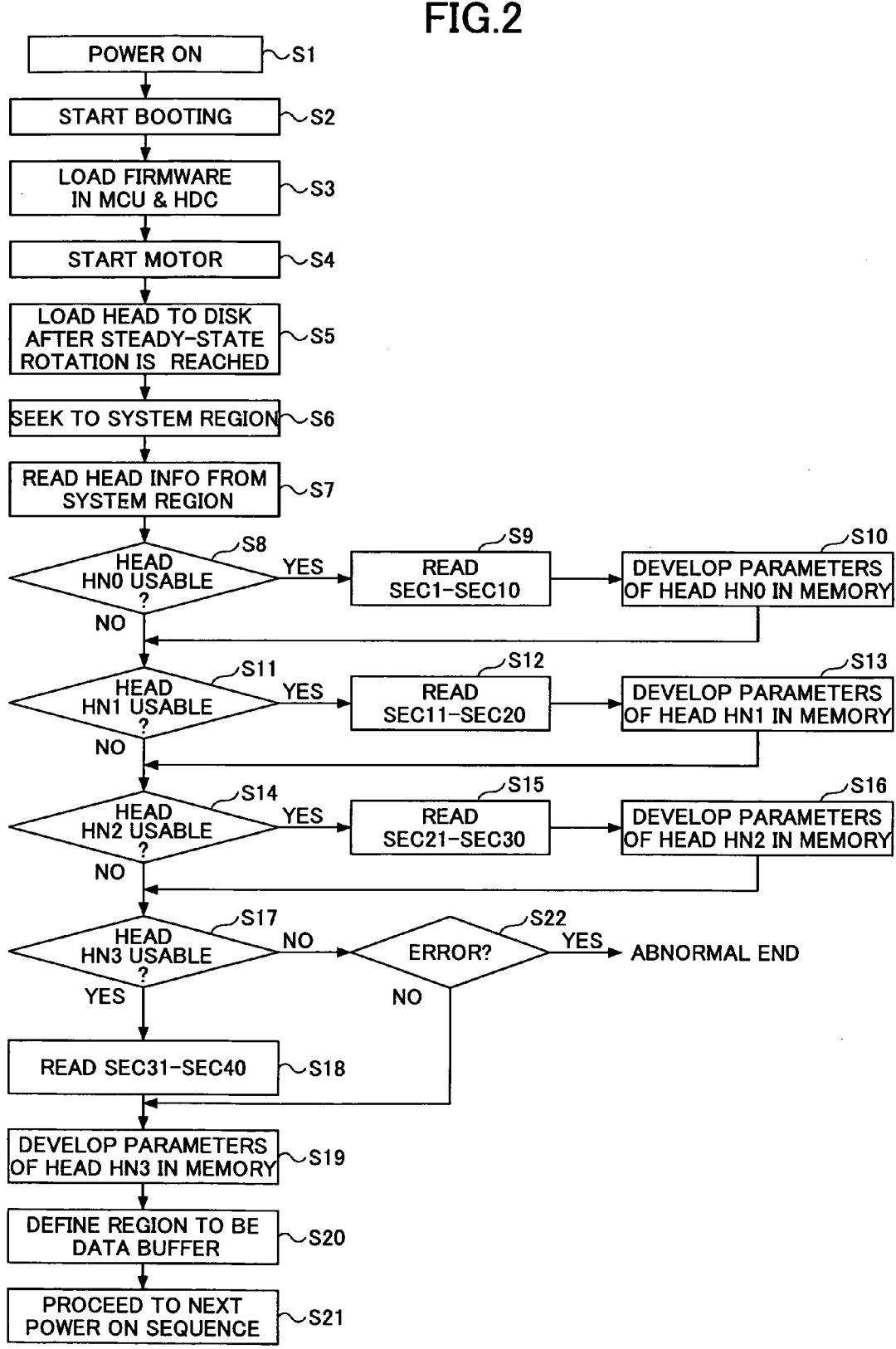

In FIG. 2, when the power is turned ON, that is, when the power is input to the magnetic disk unit 1 in a step S1, a step S2 starts to boot the magnetic disk unit 1. In a step S3, the firmware for booting the magnetic disk unit 1 is read from the ROM or the like forming the storage part (or storage means) and loaded into the MCU 31 and the HDC 34, so as to start the booting sequence of the magnetic disk unit 1. A step S4 starts the DCM 22, and a step S5 loads the head 23 on the magnetic disk 21 after the DCM 22 reaches a steady-state rotation. A step S6 carries out a seek operation to move the head 23 to the system region on the magnetic disk 21. The unit inherent information is prerecorded in the system region on the magnetic disk 21. This unit inherent information includes the head information, disk specification information and the like. The head information includes head numbers assigned to the maximum number of heads 23 that can be provided in the magnetic disk unit 1, the parameters for each head number, the head numbers of the heads 23 that are set to be usable, and the like. The disk specification information includes disk numbers (or media numbers) assigned to the maximum number of magnetic disks 21 that can be provided in the magnetic disk unit 1, the parameters (for example, the structure of the servo information, the storage capacity and the like) for each disk number, the disk numbers of the magnetic disks 21 that are set to be usable, and the like. Of the unit inherent information recorded in the system region, a step S7 reads the head information. In this particular case, it is assumed for the sake of convenience that the parameters for each head 23 are recorded in sectors that are different for each head 23, regardless of whether or not each head 23 is set to be usable.

FIG. 3 is a diagram showing an example of a relationship of the head numbers and sector numbers of the sectors in which the parameters of each head number are recorded. As shown in FIG. 3, the parameters of each of the head numbers HN0 through HN3 are recorded in mutually different sector numbers SEC1 through SEC10, SEC11 through SEC20, SEC21 through SEC30, and SEC31 through SEC40.

A step S8 decides whether or not the head information indicates that the head 23 having the head number HN0 has the usable setting. If the decision result in the step S8 is YES, a step S9 reads the parameters of the head number HN0 from the sectors having the corresponding sector numbers SEC1 through SEC10 based on the relationship shown in FIG. 3. In addition, a step S10 stores or develops the read parameters of the head number HN0 in the data buffer memory 35 as parameter tables.

If the decision result in the step S8 is NO or, after the step S10, a step S11 decides whether or not the head information indicates that the head 23 having the head number HN1 has the usable setting. If the decision result in the step S11 is YES, a step S12 reads the parameters of the head number HN1 from the sectors having the corresponding sector numbers SEC11 through SEC20 based on the relationship shown in FIG. 3. In addition, a step S13 stores or develops the read parameters of the head number HN1 in the data buffer memory 35 as parameter tables.

If the decision result in the step S11 is NO or, after the step S13, a step S14 decides whether or not the head information indicates that the head 23 having the head number HN2 has the usable setting. If the decision result in the step S14 is YES, a step S15 reads the parameters of the head number HN2 from the sectors having the corresponding sector numbers SEC21 through SEC30 based on the relationship shown in FIG. 3. In addition, a step S16 stores or develops the read parameters of the head number HN2 in the data buffer memory 35 as parameter tables.

If the decision result in the step S14 is NO or, after the step S16, a step S17 decides whether or not the head information indicates that the head 23 having the head number HN3 has the usable setting. If the decision result in the step S17 is YES, a step S18 reads the parameters of the head number HN3 from the sectors having the corresponding sector numbers SEC31 through SEC40 based on the relationship shown in FIG. 3. In addition, a step S19 stores or develops the read parameters of the head number HN3 in the data buffer memory 35 as parameter tables.

Accordingly, the parameters of the head number that is indicated as having the usable setting, of the head information read in the step S7, are read from the sectors corresponding to this head number and stored or developed in the data buffer memory 35 as the parameter tables. A step S20 defines a buffer region (addresses) that is usable as the data buffer, depending on the region (addresses) occupied by the parameter tables stored or developed in the data buffer memory 35. Hence, the region (addresses) of the data buffer memory 35, other than the region (addresses) in which the parameter tables are stored or developed, is released as the data buffer (buffer region) that may be effectively utilized for the cache operation or the like after the booting is completed. As a result, it is possible to improve the performance of the magnetic disk unit 1.

In other words, in the conventional magnetic disk unit using the firmware that stores the parameter tables at the same addresses within the data buffer memory regardless of the number of heads (or the storage capacity) that are set to be usable, the storage region for the parameter tables are reserved within the data buffer memory for the maximum number of heads that can be provided in the magnetic disk unit. For this reason, in the case of a conventional magnetic disk unit having a setting such that a number of heads smaller than the maximum number of heads that can be provided is set to be usable (that is, the number of heads settable to the usable setting is smaller than the maximum number of heads providable or accommodatable in the magnetic disk unit), a storage region within the data buffer memory is also fixedly reserved for the parameter tables with respect to the heads that are set to be non-usable (that is, having the non-usable setting) and are actually not used.

On the other hand, in this embodiment, the region (addresses) within the data buffer memory 35, other than the region (addresses) in which the parameter tables with respect to the heads 23 having the usable setting, is released as the data buffer (buffer region). In the case where the data buffer memory 35 has a memory capacity of 2 MB, for example, the percentage of the memory capacity occupied by the parameter tables for one head 23 is approximately 1.5%, the percentage of the memory capacity occupied by the parameter tables for four heads 23 is approximately 6%, and the percentage of the memory capacity used as the data buffer is approximately 80%. Accordingly, in the case where the only one head 23 has the usable setting, the percentage of the memory capacity reserved for the parameter tables in this embodiment is only approximately 1.5%, and compared to the conventional case where approximately 6% of the memory capacity is fixedly reserved for the parameter tables with respect to four heads (that is, the maximum number of heads that can be provided), this embodiment can increase the percentage of the memory capacity that is used as the data buffer by approximately 5.6%. In the case where the data buffer memory 35 has a memory capacity of 8 MB, for example, the percentage of the memory capacity occupied by the parameter tables for one head 23 is approximately 0.4%, the percentage of the memory capacity occupied by the parameter tables for four heads 23 is approximately 1.6%, and the percentage of the memory capacity used as the data buffer is approximately 96%. Hence, in the case where the only one head 23 has the usable setting, the percentage of the memory capacity reserved for the parameter tables in this embodiment is only approximately 0.4%, and compared to the conventional case where approximately 1.6% of the memory capacity is fixedly reserved for the parameter tables with respect to four heads (that is, the maximum number of heads that can be provided), this embodiment can increase the percentage of the memory capacity that is used as the data buffer by approximately 1.3%. The effect of increasing the percentage of the memory capacity that is used as the data buffer in this embodiment is greater if the memory capacity of the data buffer memory 35 is smaller, and is also greater if the maximum number of heads 23 that can be provided in the magnetic disk unit 1 is larger and the number of heads 23 having the usable setting is smaller.

After the step S20, a step S21 proceeds to the next power ON sequence. In addition, if the decision result in the step S17 is NO, a step S22 decides whether or not the decision result is NO in all of the steps S8, S11 and S14. If the decision result in at least one of the steps S8, S11 and S14 is YES and the decision result in the step S22 is NO, the process advances to the step S19. On the other hand, if the decision result is NO in all of the steps S8, S11 and S14 and the decision result in the step S22 is YES, an abnormal end occurs.

Next, a description will be given of another example of the operation of the magnetic disk unit 1 when the power is turned ON, by referring to FIG. 4. FIG. 4 is a flow chart for explaining this other example of the operation of the magnetic disk unit 1 when the power is turned ON, and corresponds to a process controlled by the MCU 31. In FIG. 4, those steps that are the same as those corresponding steps in FIG. 2 are designated by the same reference numerals, and a description thereof will be omitted.

Figure 4:
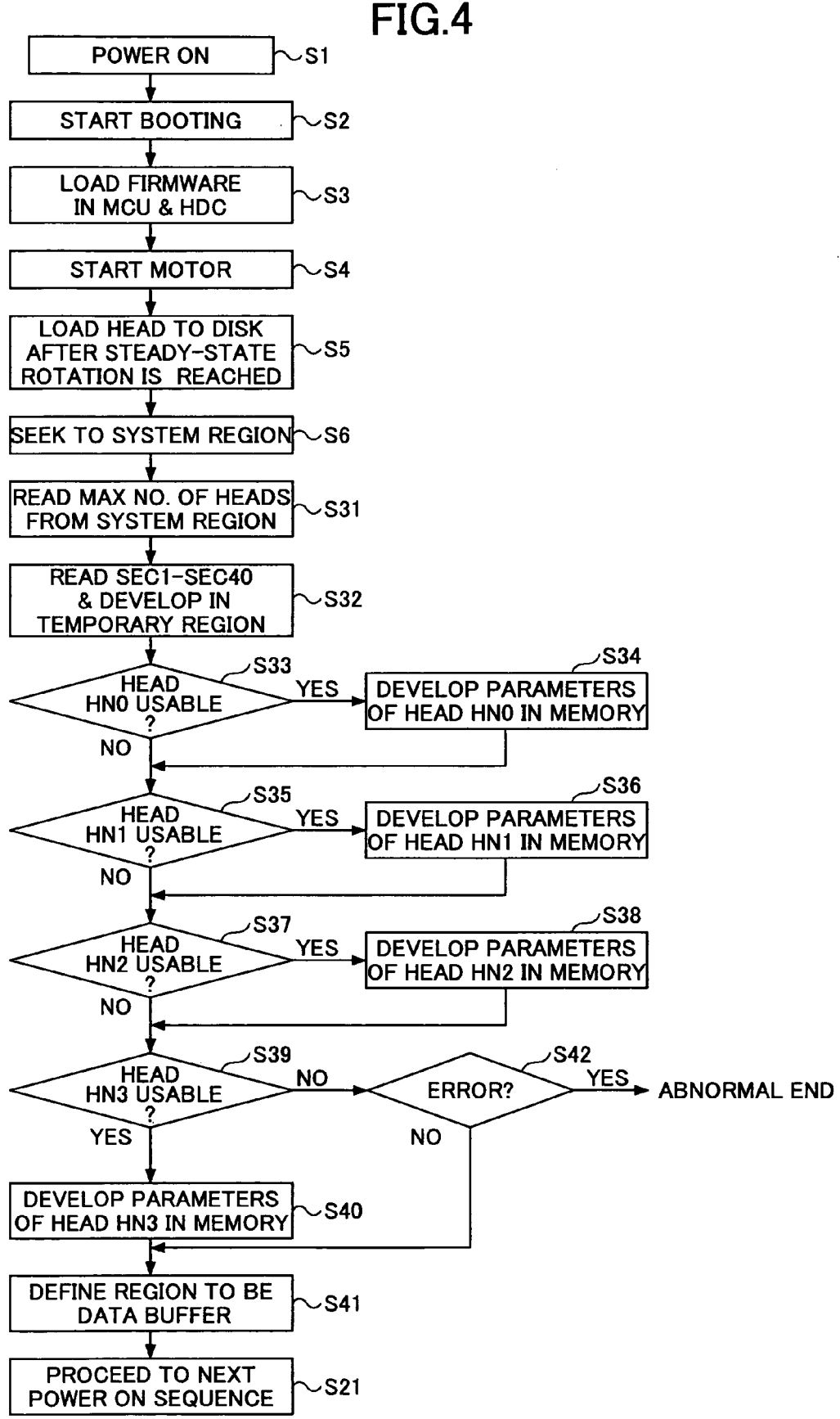

In FIG. 4, after the step S6, a step S31 reads from the system region on the magnetic disk 21 the head numbers assigned to the maximum number of heads 23 that can be provided in the magnetic disk unit 1, that is, the maximum number of heads 23, of the unit inherent information. A step S32 reads the parameters of the head numbers HN0 through HN3 from the sectors having the corresponding sector numbers SEC1 through SEC40 on the magnetic disk 21, based on the relationship shown in FIG. 3, and stores or develops the read parameters in a temporary region of the data buffer memory 35 or another memory within the storage part (or storage means).

A step S33 decides whether or not the head information indicates that the head 23 having the head number HN0 has the usable setting. If the decision result in the step S33 is YES, a step S34 stores or develops the parameters of the head number HN0 read from the temporary region in the data buffer memory 35 as parameter tables.

If the decision result in the step S33 is NO or, after the step S34, a step S35 decides whether or not the head information indicates that the head 23 having the head number HN1 has the usable setting. If the decision result in the step S35 is YES, a step S36 stores or develops the parameters of the head number HN1 read from the temporary region in the data buffer memory 35 as parameter tables.

If the decision result in the step S35 is NO or, after the step S36, a step S37 decides whether or not the head information indicates that the head 23 having the head number HN2 has the usable setting. If the decision result in the step S37 is YES, a step S38 stores or develops the parameters of the head number HN2 read from the temporary region in the data buffer memory 35 as parameter tables.

If the decision result in the step S37 is NO or, after the step S38, a step S39 decides whether or not the head information indicates that the head 23 having the head number HN3 has the usable setting. If the decision result in the step S39 is YES, a step S40 stores or develops the parameters of the head number HN3 read from the temporary region in the data buffer memory 35 as parameter tables.

A step S41 defines a buffer region (addresses) that is usable as the data buffer, depending on the region (addresses) occupied by the parameter tables stored or developed in the data buffer memory 35, and releases the temporary region. Hence, the region (addresses) of the data buffer memory 35, other than the region (addresses) in which the parameter tables are stored or developed, is released as the data buffer (buffer region) that may be effectively utilized for the cache operation or the like after the booting is completed. As a result, it is possible to improve the performance of the magnetic disk unit 1.

If the decision result in the step S39 is NO, a step S42 decides whether or not the decision result is NO in all of the steps S33, S35 and S37. If the decision result in at least one of the steps S33, S35 and S37 is YES and the decision result in the step S42 is NO, the process advances to the step S41. On the other hand, if the decision result is NO in all of the steps S33, S35 and S37 and the decision result in the step S42 is YES, an abnormal end occurs.

In this example, the parameters of all of the heads 23 are once read and stored or developed in the temporary region, and based on the head information that is read, the parameters of the head numbers having the usable setting are stored or developed in the data buffer memory 35 as the parameter tables. The effect of increasing the percentage of the memory capacity that is used as the data buffer in this embodiment is greater if the memory capacity of the data buffer memory 35 is smaller, and is also greater if the maximum number of heads 23 that can be provided in the magnetic disk unit 1 is larger and the number of heads 23 having the usable setting is smaller.

In the embodiment described above, the parameter tables are stored or developed in the data buffer memory 35 when the power of the magnetic disk unit 1 is turned ON or the power is input to the magnetic disk unit 1. However, the timing at which the parameter tables are stored or developed in the data buffer memory 35 is not limited to such, and the parameter tables may be stored or developed when forwarding the magnetic disk unit 1.

Figure 5:
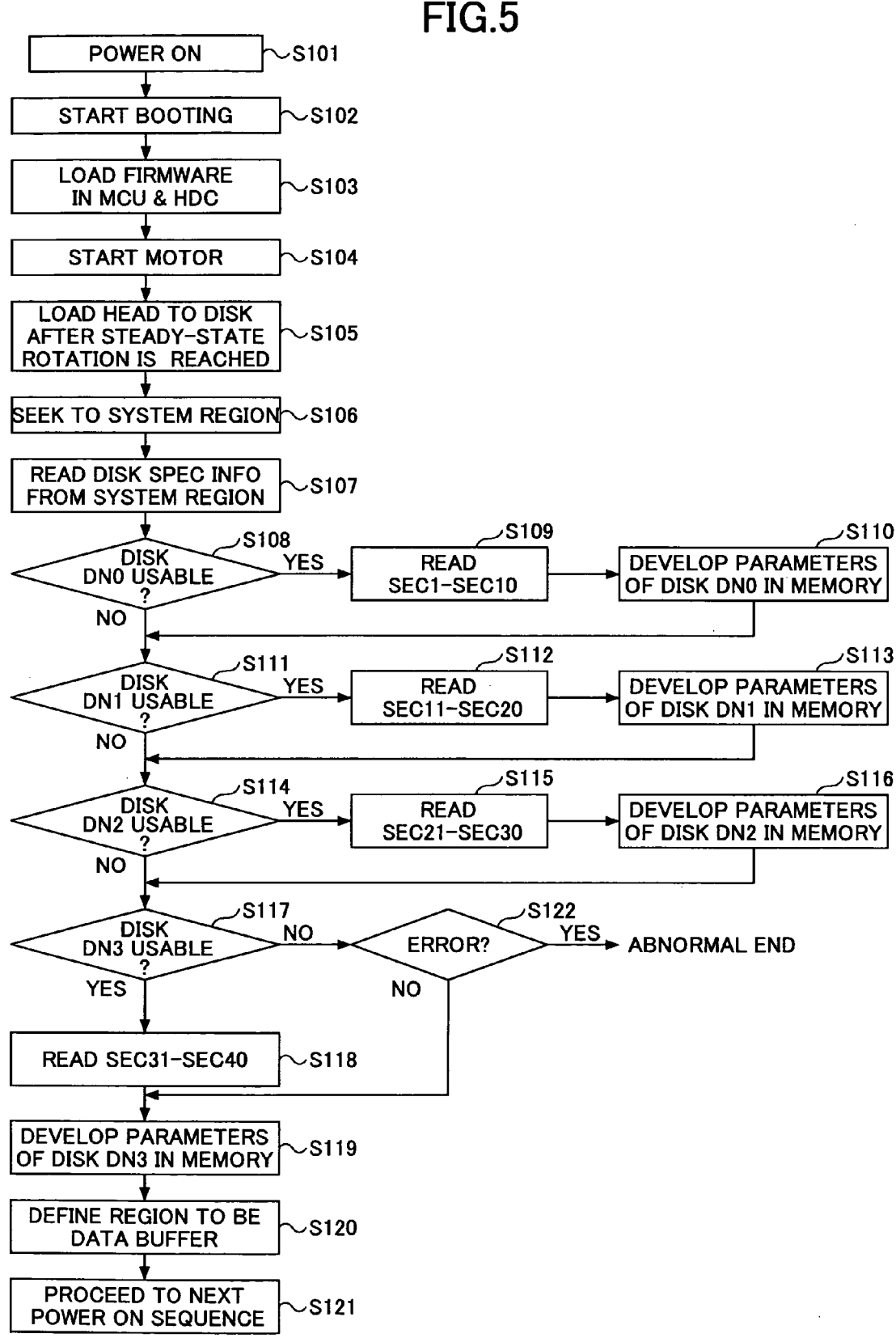

Next, a description will be given of an example of the operation of another embodiment of the magnetic disk unit according to the present invention when the power is turned ON, by referring to FIG. 5. The hardware structure of the important part of this embodiment may be the same as that shown in FIG. 1, and an illustration and description thereof will be omitted. FIG. 5 is a flow chart for explaining the example of the operation of the magnetic disk unit 1 when the power is turned ON, and corresponds to a process controlled by the MCU 31. For the sake of convenience, it is assumed that the magnetic disk unit 1 is capable of providing up to N=4 heads 23 at the maximum.

In FIG. 5, when the power is turned ON, that is, when the power is input to the magnetic disk unit 1 in a step S101, a step S102 starts to boot the magnetic disk unit 1. In a step S103, the firmware for booting the magnetic disk unit 1 is read from the ROM or the like forming the storage part (or storage means) and loaded into the MCU 31 and the HDC 34, so as to start the booting sequence of the magnetic disk unit 1. A step S104 starts the DCM 22, and a step S105 loads the head 23 on the magnetic disk 21 after the DCM 22 reaches a steady-state rotation. A step S106 carries out a seek operation to move the head 23 to the system region on the magnetic disk 21. The unit inherent information is prerecorded in the system region on the magnetic disk 21. This unit inherent information includes the head information, disk specification information and the like. The head information includes head numbers assigned to the maximum number of heads 23 that can be provided in the magnetic disk unit 1, the parameters for each head number, the head numbers of the heads 23 that are set to be usable, and the like. The disk specification information includes disk numbers (or media numbers) assigned to the maximum number of magnetic disks 21 that can be provided in the magnetic disk unit 1, the parameters (for example, the structure of the servo information, the storage capacity and the like) for each disk number, the disk numbers of the magnetic disks 21 that are set to be usable, and the like. Of the unit inherent information recorded in the system region, a step S107 reads the disk specification information. In this particular case, it is assumed for the sake of convenience that the parameters for each magnetic disk 21 are recorded in sectors that are different for each magnetic disk 21, regardless of whether or not each magnetic disk 21 is set to be usable (regardless of whether or not the corresponding head 23 is set to be usable).

If it is assumed for the sake of convenience that the relationship of the disk numbers and the sector numbers of the sectors in which the parameters of each disk number are recorded is similar to the relationship shown in FIG. 3, a step S108 decides whether or not the disk specification information indicates that the magnetic disk 21 having a disk number DN0 has the usable setting. If the decision result in the step S108 is YES, a step S109 reads the parameters of the disk number DN0 from the sectors having the corresponding sector numbers SEC1 through SEC10 based on the relationship which is similar to that shown in FIG. 3. In addition, a step S110 stores or develops the read parameters of the disk number DN0 in the data buffer memory 35 as parameter tables.

If the decision result in the step S108 is NO or, after the step S110, a step S111 decides whether or not the disk specification information indicates that the magnetic disk 21 having a disk number DN1 has the usable setting. If the decision result in the step S111 is YES, a step S112 reads the parameters of the disk number DN1 from the sectors having the corresponding sector numbers SEC11 through SEC20 based on the relationship which is similar to that shown in FIG. 3. In addition, a step S113 stores or develops the read parameters of the disk number DN1 in the data buffer memory 35 as parameter tables.

If the decision result in the step S111 is NO or, after the step S113, a step S114 decides whether or not the disk specification information indicates that the magnetic disk 21 having a disk number DN2 has the usable setting. If the decision result in the step S114 is YES, a step S115 reads the parameters of the disk number DN2 from the sectors having the corresponding sector numbers SEC21 through SEC30 based on the relationship which is similar to that shown in FIG. 3. In addition, a step S116 stores or develops the read parameters of the disk number DN2 in the data buffer memory 35 as parameter tables.

If the decision result in the step S114 is NO or, after the step S116, a step S117 decides whether or not the disk specification information indicates that the magnetic disk 21 having a disk number DN3 has the usable setting. If the decision result in the step S117 is YES, a step S118 reads the parameters of the disk number DN3 from the sectors having the corresponding sector numbers SEC31 through SEC40 based on the relationship which is similar to that shown in FIG. 3. In addition, a step S119 stores or develops the read parameters of the disk number DN3 in the data buffer memory 35 as parameter tables.

Accordingly, the parameters of the disk number that is indicated as having the usable setting, of the disk specification information read in the step S107, are read from the sectors corresponding to this disk number and stored or developed in the data buffer memory 35 as the parameter tables. A step S120 defines a buffer region (addresses) that is usable as the data buffer, depending on the region (addresses) occupied by the parameter tables stored or developed in the data buffer memory 35. Hence, the region (addresses) of the data buffer memory 35, other than the region (addresses) in which the parameter tables are stored or developed, is released as the data buffer (buffer region) that may be effectively utilized for the cache operation or the like after the booting is completed. As a result, it is possible to improve the performance of the magnetic disk unit 1.

In other words, in the conventional magnetic disk unit using the firmware that stores the parameter tables at the same addresses within the data buffer memory regardless of the number of magnetic disks (or the storage capacity) that are set to be usable, the storage region for the parameter tables are reserved within the data buffer memory for the maximum number of magnetic disks that can be provided in the magnetic disk unit. For this reason, in the case of a conventional magnetic disk unit having a setting such that a number of magnetic disks smaller than the maximum number of magnetic disks that can be provided is set to be usable (that is, the number of magnetic disks settable to the usable setting is smaller than the maximum number of magnetic disks providable or accommodatable in the magnetic disk unit), a storage region within the data buffer memory is also fixedly reserved for the parameter tables with respect to the magnetic disks that are set to be non-usable (that is, having the non-usable setting) and are actually not used.

On the other hand, in this embodiment, the region (addresses) within the data buffer memory 35, other than the region (addresses) in which the parameter tables with respect to the magnetic disks 21 having the usable setting, is released as the data buffer (buffer region). The effect of increasing the percentage of the memory capacity that is used as the data buffer in this embodiment is greater if the memory capacity of the data buffer memory 35 is smaller, and is also greater if the maximum number of magnetic disks 21 that can be provided in the magnetic disk unit 1 is larger and the number of magnetic disks 21 having the usable setting is smaller.

After the step S120, a step S121 proceeds to the next power ON sequence. In addition, if the decision result in the step S117 is NO, a step S122 decides whether or not the decision result is NO in all of the steps S108, S111 and S114. If the decision result in at least one of the steps S108, S111 and S114 is YES and the decision result in the step S122 is NO, the process advances to the step S119. On the other hand, if the decision result is NO in all of the steps S108, S111 and S114 and the decision result in the step S122 is YES, an abnormal end occurs.

Needless to say, the process with respect to the parameters that are set for each magnetic disk may be carried out in addition to the above described process with respect to the parameters that are set for each head. The order in which the process with respect to the parameters that are set for each head and the process with respect to the parameters that are set for each magnetic disk are carried out is not limited to a particular order, and these processes may be carried out in an arbitrary order. In this case, it is possible to further increase the storage region that may be used as the cache region or the like within the storage part (or storage means).

The process shown in FIG. 5 with respect to the parameters that are set for each magnetic disk is similar to the process shown in FIG. 2 with respect to the parameters that are set for each head. However, the process with respect to the parameters that are set for each magnetic disk may be similar to the process shown in FIG. 4 with respect to the parameters that are set for each head. In this case, the process with respect to the parameters that are set for each magnetic disk may be carried out in addition to the above described process with respect to the parameters that are set for each head, and the processes may be carried out in an arbitrary order.

According to the present invention, it is possible to suppress an increase in the storage region within the storage part (or storage means) for storing the parameters that are set for each head and/or each magnetic disk. Hence, it is possible to prevent the performance of the magnetic disk unit from deteriorating by preventing the decrease of the storage capacity that may be used for the cache operation or the like. In other words, by taking measures so that the storage region for storing the parameters with respect to each head and/or each magnetic disk that is set to be usable, of the parameters that are set for each head and/or each magnetic disk, is not reserved within the storage part (or storage means) of the magnetic disk unit, so that the storage region that may be used as the cache region or the like within the storage part (or storage means) is increased by the amount not reserved, to thereby improve the performance of the magnetic disk unit.

This application claims the benefit of a Japanese Patent Application No. 2005-274229 filed Sep. 21, 2005, in the Japanese Patent Office, the disclosure of which is hereby incorporated by reference.

Further, the present invention is not limited to these embodiments, but various variations and modifications may be made without departing from the scope of the present invention.

What is claimed is:

1. A magnetic disk unit in which a number of heads that is settable to a usable setting is less than a maximum number of heads providable in the magnetic disk unit, said magnetic disk unit comprising:
    a storage part configured to provide a buffer region that is usable as a data buffer;
    a reading part configured to read head information from a magnetic disk; and
    a control part configured to reserve a storage region in the storage part for storing the head information based on the maximum number of heads included in the head information, to store parameters with respect to the heads having the usable setting in the reserved storage region of said storage part, and to release a region of the storage part other than a storage region occupied by the parameters of the reserved storage region, when storing the head information in the storage part.

2. The magnetic disk unit as claimed in claim 1, wherein the reading part reads head numbers assigned to the maximum number of heads providable in the magnetic disk unit, the parameters for each head number, and the head numbers of the heads having the usable setting, from a system region on the magnetic disk.

3. The magnetic disk unit as claimed in claim 2, wherein the control part develops the parameters with respect to the heads having the usable setting in the storage part as parameter tables.

4. The magnetic disk unit as claimed in claim 2, further comprising:
    a temporary region,
    wherein the control part once stores the parameters of all of the head numbers in the temporary region, reads only the parameters with respect to the heads having the usable setting from the temporary region, stores the read parameters in the storage part and releases the temporary region.

5. The magnetic disk unit as claimed in claim 4, wherein the control part develops the parameters with respect to the heads having the usable setting in the storage part as parameter tables.

6. The magnetic disk unit as claimed in claim 2, wherein the parameters with respect to each head number include at least one parameter selected from a group consisting of a parameter dependent upon characteristics of the magnetic disk corresponding to each head, read frequency, sense current of an MR head, AGC gain, filter cutoff frequency, boost of specific portion of the filter characteristic, constants of a FIR filter, vertical asymmetry correction of the reproduced waveform, write frequency, write precompensation, write current, overshoot of the write current, and a driving current applied to a built-in heater of the head.

7. The magnetic disk unit as claimed in claim 1, wherein the parameters are set for each temperature and/or each zone on the magnetic disk.

8. The magnetic disk unit as claimed in claim 1, wherein the control part stores the parameters in the storage part when a power of the magnetic disk unit is turned ON or when the power is input to the magnetic disk unit.

* * * * *